United States Patent [19]

Wang

[11] Patent Number: 5,465,568
[45] Date of Patent: Nov. 14, 1995

[54] CHAIN STRUCTURE FOR BICYCLES

[75] Inventor: Wen-Bin Wang, Tainan Hsien, Taiwan

[73] Assignee: Yaban Chain Industrial Co., Ltd., Tainan Hsien, Taiwan

[21] Appl. No.: 373,057

[22] Filed: Jan. 17, 1995

[51] Int. Cl.$^6$ ................................................. F16G 13/00
[52] U.S. Cl. ........................ 59/4; 59/5; 59/78; 474/206
[58] Field of Search ..................... 59/4, 5, 78; 474/206

[56] References Cited

U.S. PATENT DOCUMENTS

| 2,773,971 | 12/1956 | Teerlink | 59/5 |
| 5,066,265 | 11/1991 | Wu | 474/206 |
| 5,098,349 | 3/1992 | Wu | 474/206 |
| 5,151,066 | 9/1992 | Wu | 474/206 |

FOREIGN PATENT DOCUMENTS

| 52058 | 4/1977 | Japan | 59/4 |
| 228639 | 9/1989 | Japan | 59/5 |
| 266342 | 10/1989 | Japan | 59/5 |
| 2260592 | 4/1993 | United Kingdom | 59/5 |

*Primary Examiner*—David Jones
*Attorney, Agent, or Firm*—Morton J. Rosenberg; David I. Klein

[57] ABSTRACT

A chain structure for bicycles is composed of a series of inner chain plates, outer chain plates, rollers, and pins. Each inner plate has three arcuate peripheries at respective ends and slanting surfaces along one side of the arcuate peripheries. Each outer plate has also three arcuate peripheries at respective ends and slanting surfaces along one side of the arcuate peripheries. The slanting surfaces of the inner chain plates and outer chain plates are adapted to facilitate engagement of sprocket teeth with the chain plate.

1 Claim, 7 Drawing Sheets

CHAIN STRUCTURE FOR BICYCLES

BACKGROUND OF THE INVENTION

This invention relates to a chain structure for bicycles, and more particularly, to a chain structure having inclined surfaces on the peripheries of inner and outer chain plates adapted to facilitate the engagement of the chain structure with sprocket teeth.

The evolution of bicycles, both in their function and appearance, have prompted changes in chain structure to accommodate various evolving requirements. Such a chain structure change is the formation of a pair of inclined surfaces at the center portion of each chain link to form a wider distance between opposed chain plates to facilitate engagement of sprocket teeth with the chain link, as shown in FIG. 6. This modification has provided more space for the engagement; however, when a switch in the sprocket wheel is prompted by a gear shift, the sprocket teeth will first engage the arcuate surface of a given chain plate, as shown in FIG. 7. Another change in chain structure has been to minimize the thickness and length of each chain plate in order to facilitate engagement with sprocket teeth. This change has increased engagement stability, but has also decreased the engaging area available to effect disengagement of the sprocket teeth from the chain structure.

SUMMARY OF THE INVENTION

It is the primary object of the present invention to provide a chain structure for bicycles which has a pair of arcuate surfaces at respective sides of the center portion of each chain plate so as to increase the sprocket wheel teeth engaging area.

In support of the above object, another object of the present invention is to provide a chain structure for bicycles which prevents the erroneous disengagement of sprocket wheel teeth therefrom.

It is a further object of the present invention to provide a chain structure for bicycles which is easy to assemble and disassemble.

DETAILED DESCRIPTION OF THE PREFERRED EMBODIMENT

Figure 1:
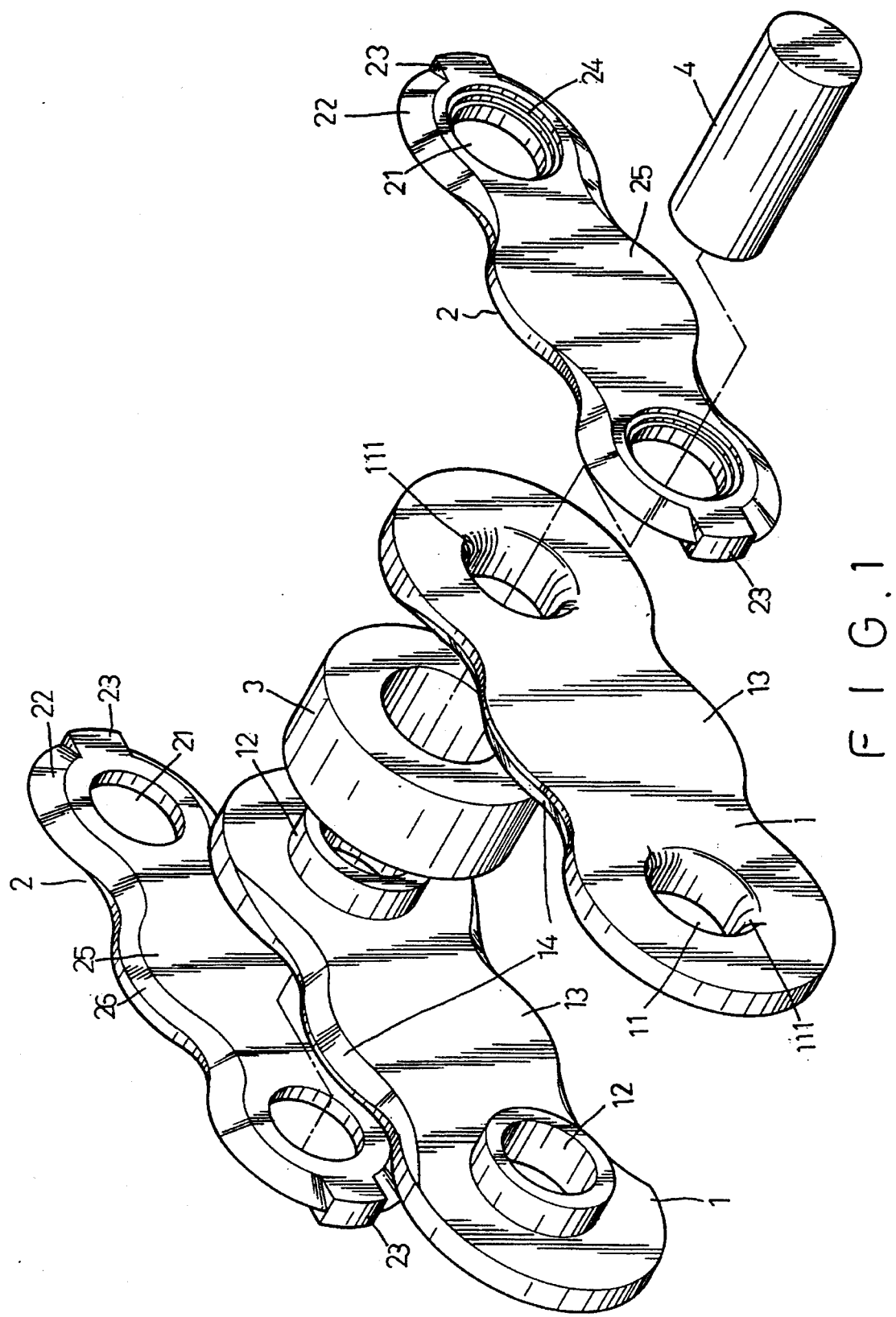
FIG. 1 is an exploded perspective view of the preferred embodiment of the present invention.

Referring now to FIGS. 1–5, there is shown the preferred embodiment of the chain structure of the present invention. FIG. 1 shows a pair of inner chain plates 1, a pair of outer chain plates 2, one of a plurality of rollers 3, and one of a plurality of pins 4 forming the present invention.

Each inner chain plate 1 is generally formed by three portions, a central portion 13, and two end portions, each of which has a through hole 11 formed therethrough. Each inner chain plate 1 also includes two tubular flanges 12 extending from the inner side of the through holes 11 adapted to be received within the roller 3. The outer side of each through hole 11 is bounded by a rounded lip 111. The central portion 13 has a pair of raised, arcuate surfaces extending from the top and bottom ends thereof which increase the surface area engaging a given tooth of a sprocket wheel. On the inside plate surface periphery of each central portion 13 are formed inclined surfaces 14 for guiding the insertion of a sprocket tooth into the space between a coupled pair of inner chain plates 1.

Each outer chain plate 2 is also formed by three portions, a central portion 25 and two end portions. The two outer plate end portions having a smaller diameter than that of the two end portions of the inner chain plate 1. The outer chain plate 2 includes a through hole 21 at each end portion, and inclined surfaces 22 on both sides, at the tops and bottoms of the end portions, with a pair of blocks 23 protruding from respective end portions to separate the top and bottom inclined surfaces 22. Note that on the inner side of each outer chain plate 2, the inclined surface 22 continues around the entire periphery of the plate 2, interrupted only by the blocks 23, as indicated by the inclined surface ring 26.

Each through hole 21 is bounded on the outer side by a larger diameter circle 24 such that an annular recess is thereby formed For receiving a riveted (flattened) end created on the pin 4 to lock the chain structure assembly.

Figure 2:
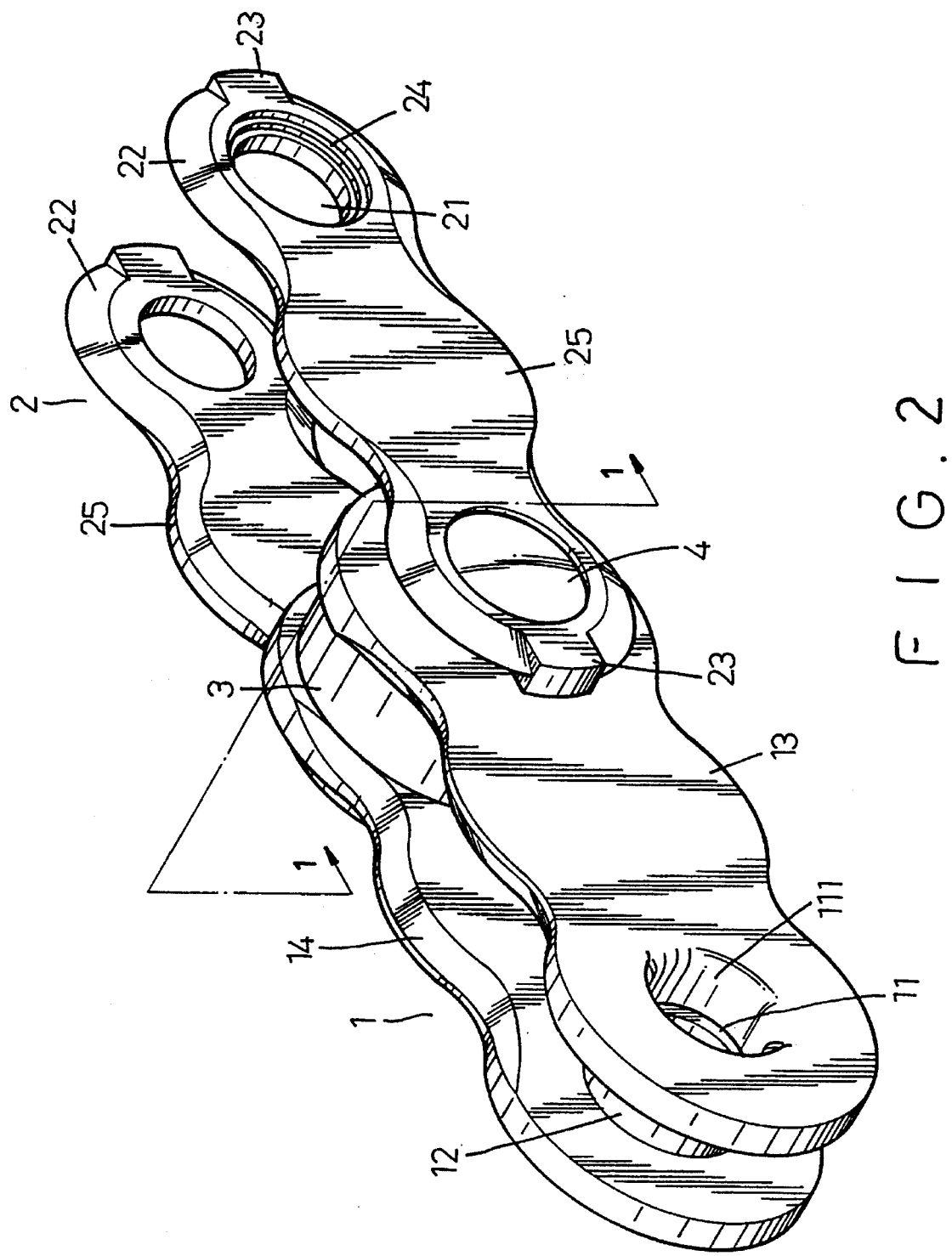
FIG. 2 is a perspective view of the preferred embodiment of the present invention.

Assembly of the chain structure is effected by inserting each tubular flange 12 of an inner chain plate 1 into a roller 3 and inserting each tubular flange 12 of an opposing inner chain plate 1 into the given roller 3 from the opposite end, as shown in FIG. 2. A pair of outer chain plates 2 are then placed on the outer sides of the inner chain plates 1 with the through holes 21 at one end portion of each chain plate 2 axially aligning with a through hole 11 at one end portion of the given inner chain plate 1. Pin 4 is then inserted through the through holes 21, 11 and the roller 3. The two exposed ends of the pin 4 are thereafter flattened and embedded in the annular recess formed within the larger diameter circle 24, as shown in FIG. 3.

Figure 3:
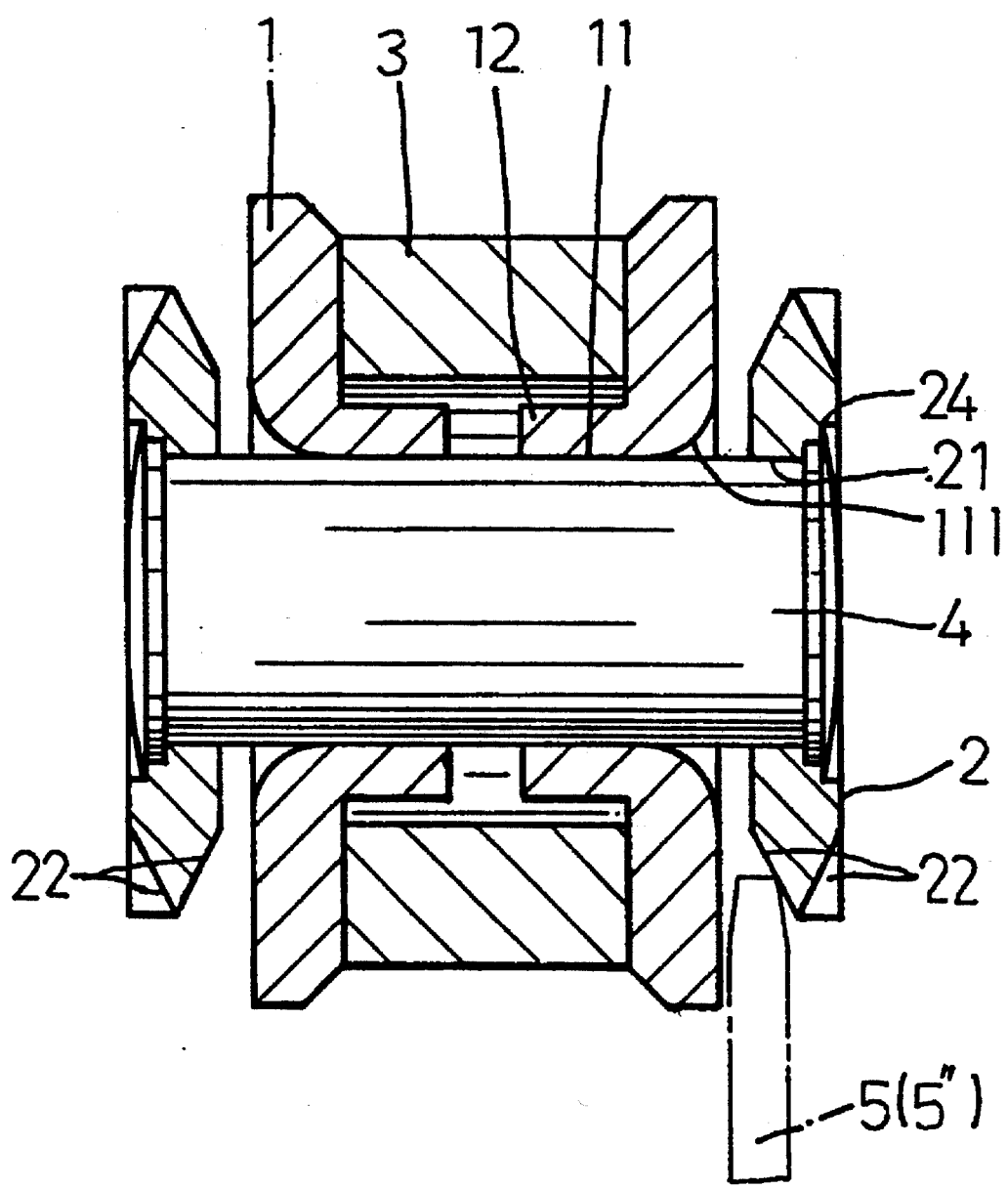
FIG. 3 is a cross-sectional view taken along Line 1—1 of FIG. 2.
Figure 4:
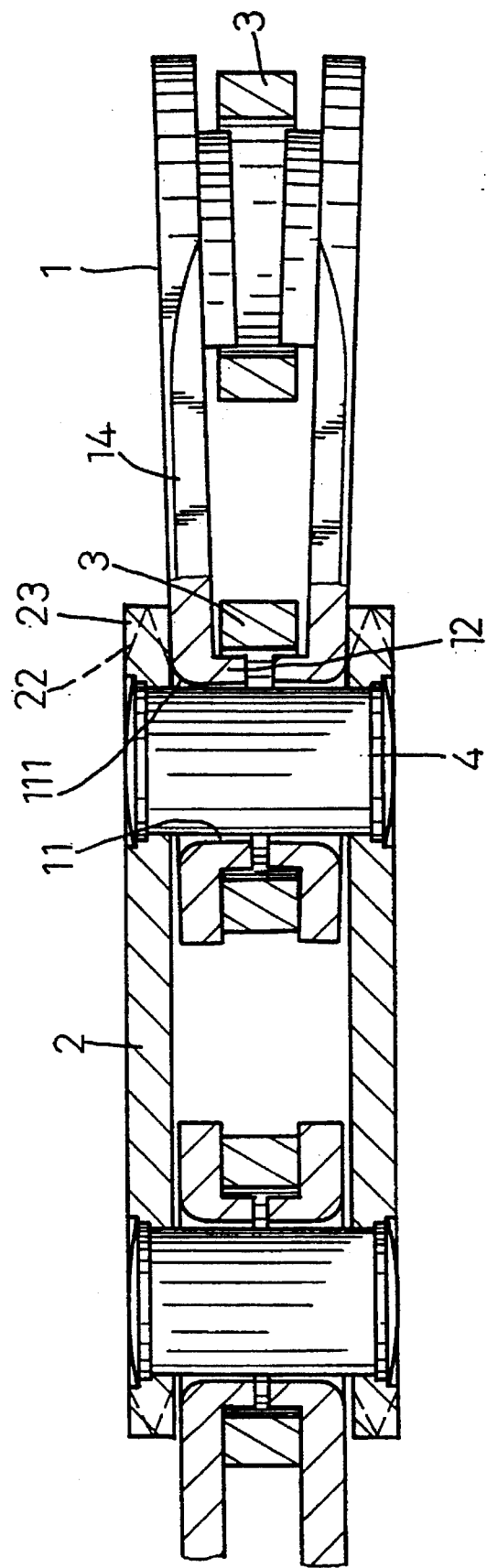
FIG. 4 is a cross sectional view of the preferred embodiment of the present invention.

Once the chain structure is assembled, a clearance is formed between the inclined surfaces 22 of outer chain plate 2 and their adjacent inner chain plates 1 sufficient to receive a front end of a sprocket tooth 5, as shown in FIG. 3.

Figure 5:
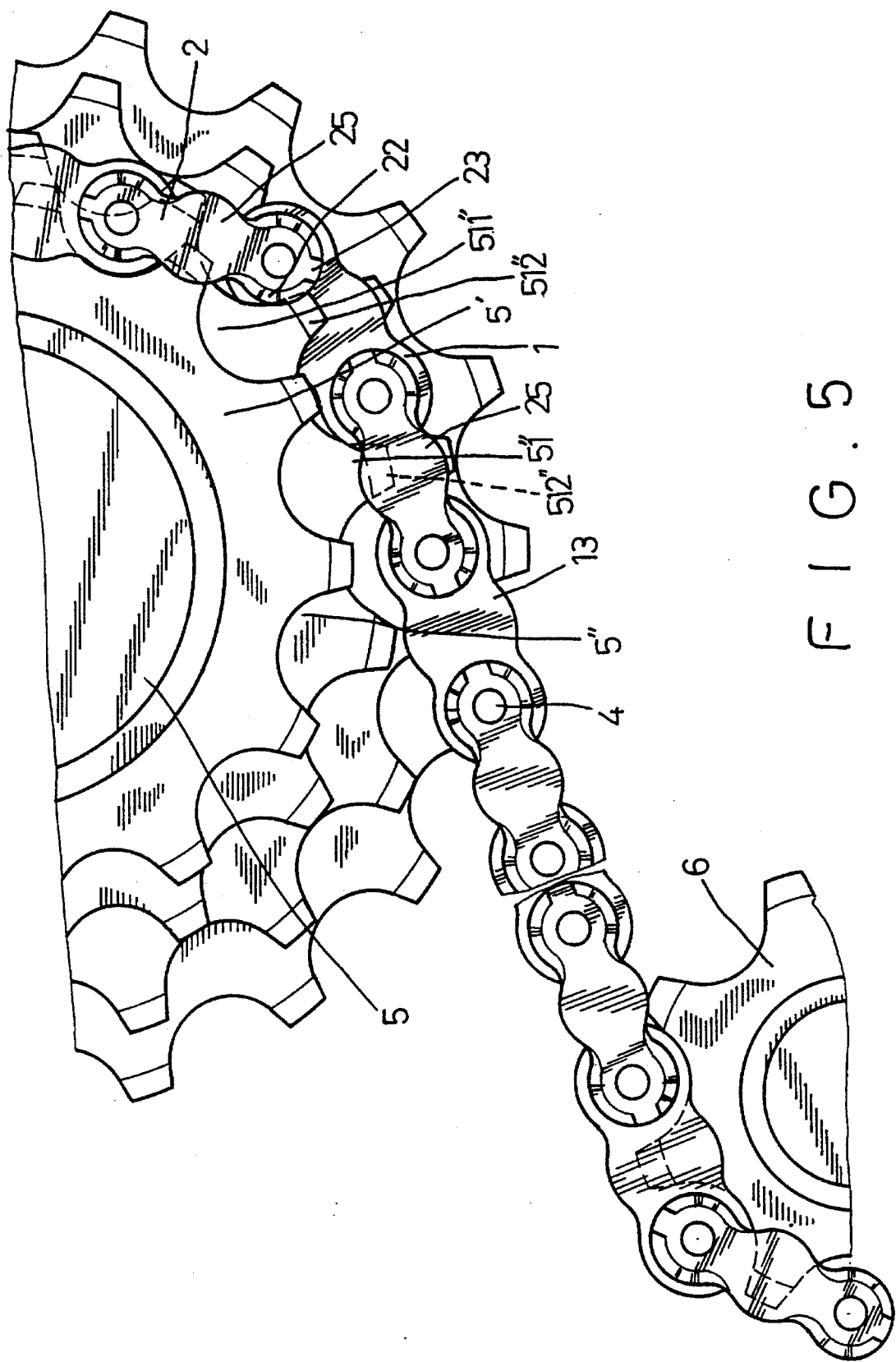
FIG. 5 is an elevational view of the preferred embodiment of the present invention implemented on a standard set of bicycle sprocket wheels showing a chain being engaged with the sprocket wheels.
Figure 6:
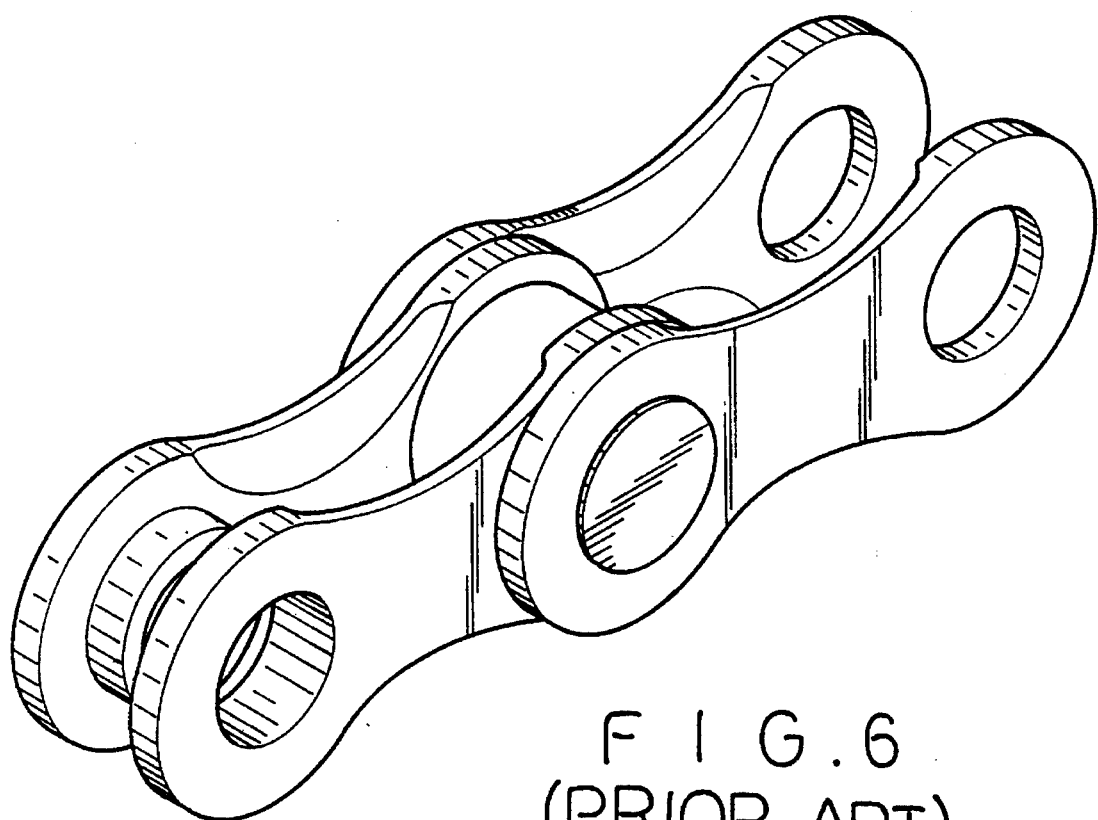
FIG. 6 is a perspective view of a prior art chain structure.
Figure 7:
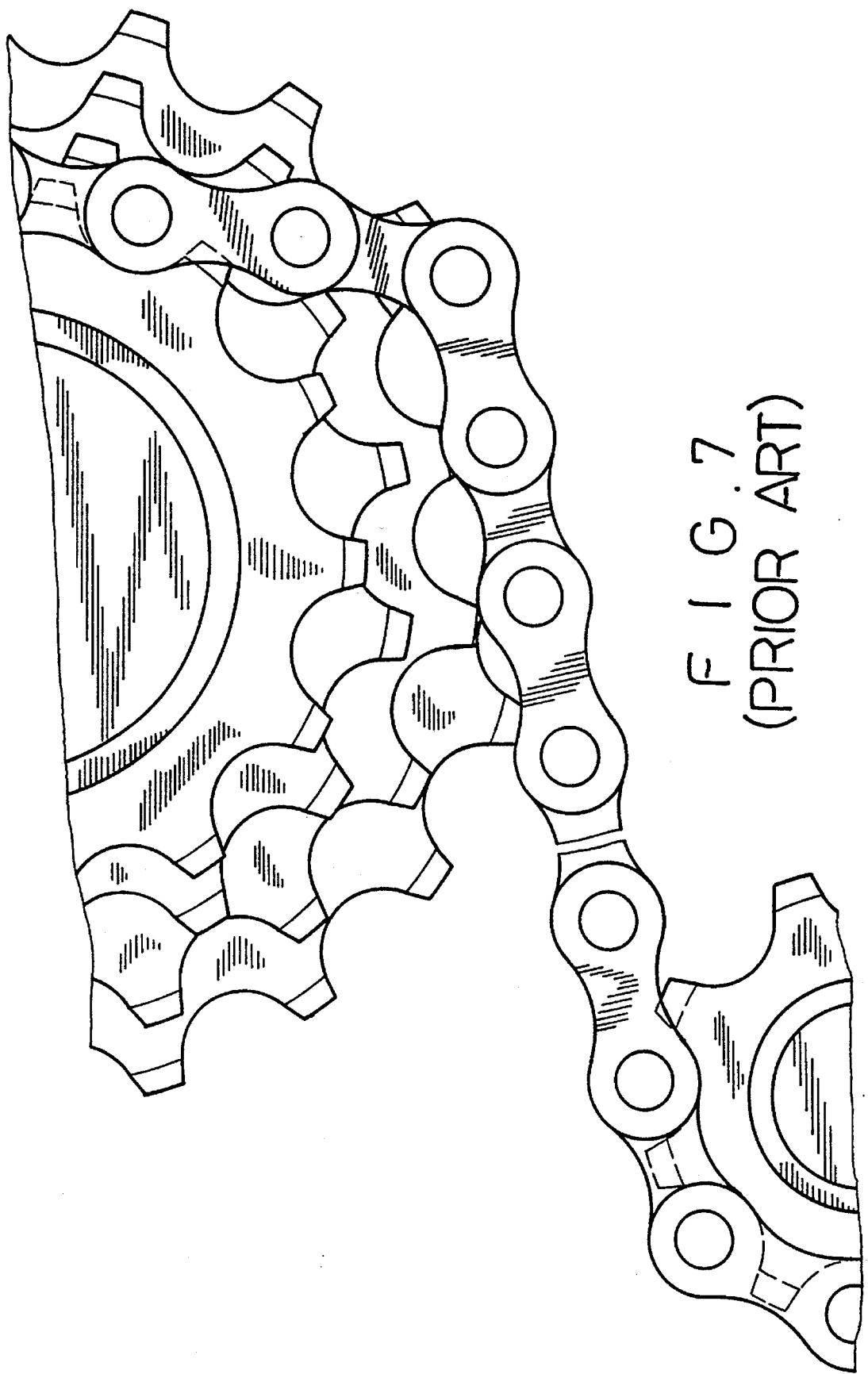
FIG. 7 is an elevational view of a prior art chain structure implemented on a standard set of bicycle sprocket wheels.

Referring to FIG. 5 and FIG. 6, the inclined surfaces 22 of the outer chain plates 2 will guide the sprocket tooth peak 512" to slide into the sprocket space formed between the outer chain plates 2, with the raised inner walls of the central portions 25 of the outer chain plates 2 holding the sprocket tooth root 511" firmly therein for the duration of the given engagement.

Although the present invention has been described with reference to a preferred embodiment, those skilled in the art will recognize that changes may be made in form and detail without departing from the spirit and scope of the invention.

I claim:

1. A chain structure for engaging a sprocket tooth of a bicycle sprocket comprising:

(a) at least a pair of inner chain plates coupled each to the other defining a first sprocket space therebetween for removable insert therein of a sprocket tooth, each of said inner chain plates having opposing inner and outer faces defining an inner plate edge portion, each of said inner and outer faces forming an elongated planar contour having a pair of mutually distal end portions and a central portion therebetween, each of said end portions having formed therethrough a through hole, each of said inner and outer faces of each said inner chain plate having an arcuate central portion peripheral contour for lateral retention of said sprocket tooth when said sprocket tooth is inserted within said first sprocket space, said inner plate edge portion having at each section thereof proximal to said central portion at least one inner plate inclined surface adjacent said inner face and having a predetermined incline for guiding the insert of said sprocket tooth into said first sprocket space;

(b) a roller rotatably captured between opposing inner faces of said coupled pair of inner chain plates, said roller having a tubular contour defining an axial through opening, said axial through opening being axially aligned with one of said end portion through holes of each of said coupled pair of inner chain plates;

(c) at least a pair of outer chain plates respectively coupled to said outer faces of said coupled pair of inner chain plates and arranged to form therebetween a second sprocket space for removable insert therein of said sprocket tooth, each of said outer chain plates having opposing first and second faces defining an outer plate edge portion, each of said first and second faces forming an elongated planar contour having a pair of mutually distal outer plate end portions and an outer plate central portion therebetween, each of said outer plate end portions having formed therethrough an outer plate through hole, said second face having formed therein a pair of annular recesses axially aligned, respectively, with said outer plate through holes, each of said first and second faces of each said outer chain plate having an arcuate outer plate central portion peripheral contour for retention of said sprocket tooth when said sprocket tooth is inserted within said second sprocket space, said first and second faces and said outer plate edge portion forming at the periphery of each outer plate end portion a protruding block portion, said outer plate edge portion having at each section adjacent said block portion a first outer plate inclined surface adjacent said first face and a second outer plate inclined surface adjacent said second face, said first outer plate inclined surface having a predetermined incline for guiding the insert of said sprocket into said second sprocket space; and, (d) an assembly pin for pivotally coupling together said inner chain plates, said roller, and said outer chain plates.

* * * * *